US011678957B2

(12) United States Patent
Nimmer et al.

(10) Patent No.: US 11,678,957 B2
(45) Date of Patent: Jun. 20, 2023

(54) ORTHODONTIC DEBONDING TOOL

(71) Applicant: American Orthodontics Corporation, Sheboygan, WI (US)

(72) Inventors: Eric W. Nimmer, Plymouth, WI (US); Lindy Couwenhoven, Grafton, WI (US); Juan Montes de Oca, Sheboygan, WI (US)

(73) Assignee: American Orthodontics Corporation, Sheboygan, WI (US)

( * ) Notice: Subject to any disclaimer, the term of this patent is extended or adjusted under 35 U.S.C. 154(b) by 365 days.

(21) Appl. No.: 16/900,318

(22) Filed: Jun. 12, 2020

(65) Prior Publication Data

US 2021/0386520 A1 Dec. 16, 2021

(51) Int. Cl.
*A61C 7/02* (2006.01)
*A61C 7/14* (2006.01)

(52) U.S. Cl.
CPC .............. *A61C 7/023* (2013.01); *A61C 7/146* (2013.01)

(58) Field of Classification Search
CPC ........... A61C 7/023; A61C 7/146; A61C 3/00; B23B 31/201; B25B 7/14
USPC ................. 279/52; 81/326–327, 334, 65
See application file for complete search history.

(56) References Cited

U.S. PATENT DOCUMENTS

| 5,062,793 | A | 11/1991 | Cleary | |
|---|---|---|---|---|
| 7,670,140 | B2 * | 3/2010 | Hart ....................... | A61C 7/023 433/4 |
| 8,128,400 | B2 | 3/2012 | Farzin-Nia | |
| 8,956,159 | B2 | 2/2015 | Shanmugham | |
| 10,034,723 | B2 | 7/2018 | Mozaffari et al. | |
| 2009/0042164 | A1 * | 2/2009 | Maehata .................. | A61C 7/02 433/141 |
| 2011/0143299 | A1 | 6/2011 | Foerster | |
| 2019/0247147 | A1 | 8/2019 | Grande et al. | |

FOREIGN PATENT DOCUMENTS

CN 110584806 A 12/2019

OTHER PUBLICATIONS

Extended European Search Report corresponding to European Patent Application No. 21179152.0, dated Nov. 4, 2021.

* cited by examiner

*Primary Examiner* — Cris L. Rodriguez
*Assistant Examiner* — Drew S Folgmann
(74) *Attorney, Agent, or Firm* — Andrus Intellectual Property Law, LLP

(57) ABSTRACT

A debonding tool for removal of orthodontic brackets includes a handle. An arm extends from the handle. The debonding tool includes first and second opposed fingers. A collar is translatable along the arm and operates to effect relative movement of the first and second opposed fingers between the open and closed positions.

17 Claims, 13 Drawing Sheets

ORTHODONTIC DEBONDING TOOL

BACKGROUND

The present disclosure relates to the field of orthodontics. More specifically, the present disclosure relates to a debonding tool for removing orthodontic brackets from the teeth of a patient.

Orthodontic treatment often involves at least a combination of an arch wire and brackets and/or buccal tubes that are used to secure the arch wire to the teeth of the patient. The arch wire is made of a resilient material that, if bent or deformed, will return to its previous shape. Dental malocclusions are treated by securing the arch wire to the patient teeth which are brought into a post-treatment alignment as the arch wire returns to its original shape. The corrective forces are transferred from the interactions between the arch wire and the arch wire slot of the bracket, through the bracket to the tooth.

Traditionally, brackets are secured to the teeth of a patient with an adhesive. The brackets have an arch wire slot within which the arch wire is received. Elastomeric ligatures secure the arch wire within the arch wire slot of the bracket. Self-ligating brackets include a built in mechanical ligature which eliminates the need for separate elastomeric ligatures to secure the arch wire to the bracket. Self-ligating brackets typically use a sliding and/or rotating clip or door that moves relative to the bracket body to occlude the arch wire slot. When treatment is complete, or a bracket is damaged, the bracket must be removed. Removal of the bracket should be done in a manner that avoids tooth enamel damage. Tools are available for the removal of orthodontic brackets from the teeth of patients, for example, those disclosed in U.S. Pat. Nos. 7,670,140; 8,128,400; 8,956,159; U.S. Ser. No. 10/034,723; US 20110143299; and US20190247147, each of which are incorporated by reference in their entireties.

Metal brackets are typically removable from teeth with the use of a pliers to apply a compressive force against the bracket, for example mesio-distally or gingival-occlusally, or some orientation in between. The ductile nature of the metal bracket provides some give and flexibility to the bracket to twist and/or deform, weakening the adhesion of the bracket to the tooth by the adhesive. The adhesive is overcome with continued movement of the bracket with the pliers.

However, some orthodontic patients prefer the aesthetic appearance of ceramic, polycarbonate, or crystalline brackets over the appearance of metal brackets. While brackets of these materials have similar clinical performance to metal brackets, these materials do not have the ductile qualities of metal. These more rigid materials resist debonding and therefore present a challenge during removal. This challenge can lead to patient discomfort during the debonding process. Current solutions also may result in breakage of brackets during removal due to the distribution, or lack thereof, of forces on the bracket during removal.

BRIEF DISCLOSURE

An example of a debonding tool for removal of orthodontic brackets includes a handle. An arm extends from the handle. The debonding tool includes first and second opposed fingers. The first and second opposed fingers are operable between an open position and a closed position. A collar is translatable along the arm and operates to effect relative movement of the first and second opposed fingers between the open and closed positions.

In further examples of the debonding tool, in the closed position the first and second opposed fingers are closer together compared to the first and second opposed fingers in the open position. The first and second opposed fingers may define a channel therebetween, the channel configured to receive an orthodontic bracket therein. The collar may include a bore and the arm is coaxially received within the bore of the collar. The arm may include a barrel with exterior threads. The bore of the collar may include threads. The arm and the collar may be threadingly engaged to move the first and second opposed fingers between the open and closed positions. The arm may include an angled flange at a transition between the barrel and the first and second opposed fingers. The bore of the collar may include an interior chamfer. Engagement between the angled flange and the interior chamfer moves the first and second opposed fingers between the open and closed positions. An angle of the angled flange relative to the axis of the arm is greater than an angle of the interior chamfer relative to the axis of the arm. A keyhole may separate the first and second opposed fingers, in which the keyhole includes an eye through the barrel and a slot extending from the eye to the channel.

In further examples of the debonding tool, the first and second opposed fingers each terminate in projections, and the projections of the respective first and second opposed fingers define the channel. In the open position the first and second opposed fingers may be parallel. The first and second opposed fingers may be coaxial to the arm. The first and second opposed fingers may each include a groove that separates projections on a respective finger of the first and second opposed fingers. The handle and the collar may further each include a textured surface. The handle may have a major axis that is perpendicular to a major axis of at least a portion of the arm.

A debonding tool for the removal of orthodontic brackets may include a handle. An arm extends from the handle. The arm includes a bend such that a portion of the arm extends perpendicular to the handle. The portion of the arm terminates in a tip that includes first and second opposed fingers. The first and second opposed fingers are separated by a keyhole with an eye positioned within a barrel of the arm and a slot extending from the eye between first and second opposed fingers. Each of the first and second opposed fingers terminate in at least one projection and define a channel between the projections of the first and second opposed fingers. The channel is configured to receive an orthodontic bracket therein. A collar includes a bore and the arm is received within the bore. Interior threads of the bore threadingly engage exterior threads of the barrel to translate the collar relative to the arm. An interior chamfer of the bore engages an angled flange of the arm as the collar translates along the arm to move the first and second opposed fingers between open and closed positions.

An orthodontic system includes an orthodontic bracket and a debonding tool. The orthodontic bracket includes a mesial sidewall and a distal sidewall. The debonding tool includes a handle, an arm, and a collar. The arm extends from the handle. The arm includes a bend such that a portion of the arm extends perpendicular to the handle. The portion of the arm terminates in a tip that includes first and second opposed fingers. The first and second opposed fingers are separated by a keyhole with an eye positioned within a barrel of the arm and a slot extending from the eye between first and second opposed fingers. Each of the first and second opposed fingers terminate in at least one projection and define a channel between the projections of the first and second opposed fingers. The channel is configured to receive an orthodontic bracket therein. The collar includes a bore and the arm is received within the bore. Interior threads of the bore threadingly engage exterior threads of the barrel to translate the collar relative to the arm. An interior chamfer of the bore engages an angled flange of the arm as the collar translates along the arm to move the first and second opposed fingers between open and closed positions.

Further examples of the orthodontic system may include the arm includes a barrel with exterior threads. The collar includes a bore that includes interior threads. The arm is coaxially received within the bore of the collar. The collar includes a bore and the arm and the collar are threadingly engaged to move the first and second opposed fingers between the open and closed positions. An arch wire may extend through the orthodontic bracket. The first and second opposed fingers may each include a groove that separates projections on a respective finger of the first and second opposed fingers. The arch wire extends through the grooves of the first and second opposed fingers when the orthodontic bracket is received within the channel. The orthodontic bracket may include a bonding pad. The first and second opposed fingers each may include at least one projection defining the channel. The projections may further include a shelf that extends from the channel in a direction into the projection. The shelves may define portions of the channel configured to receive the bonding pad therein.

DETAILED DISCLOSURE

Figure 1:
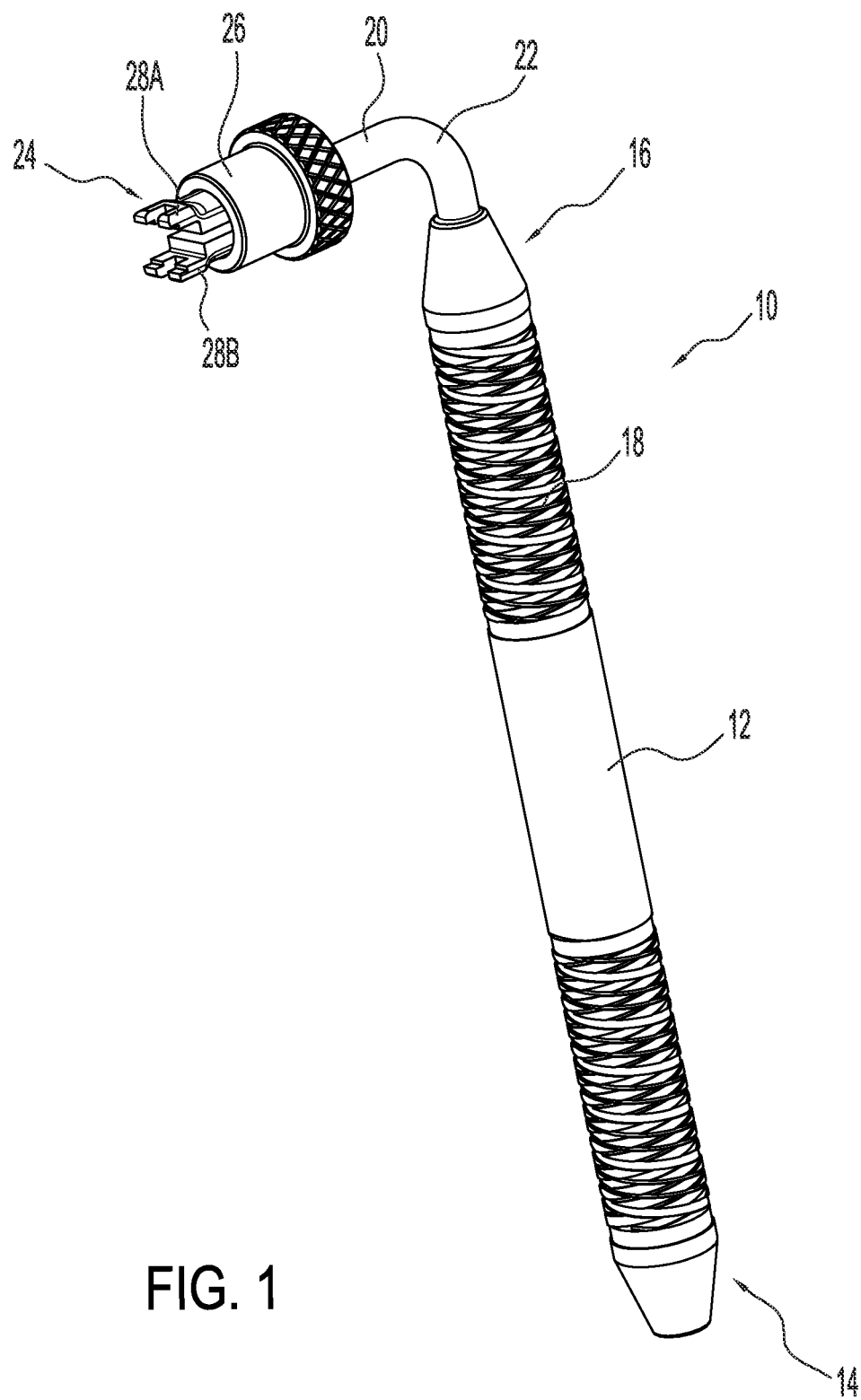
FIG. 1 is a perspective view of a debonding tool.

FIG. 1 depicts an example of a debonding tool 10. The debonding tool 10 is configured to be used to remove an orthodontic bracket from the tooth of a patient. The orthodontic bracket is secured to the enamel of a patient's tooth with the use of an adhesive. The adhesive may be any of a variety of known bio-compatible adhesives, including composites, resins, epoxies, ionomers, or copolymers. The adhesives may exemplarily be chemical-curing or light-curing.

The debonding tool 10 includes a handle 12. The handle 12 extends between a distal end 14 and a proximal end 16. The handle 12 may include a textured surface 18, for example knurling or a polymer coating between the distal end 14 and the proximal end 16. An arm 20 extends from the proximal end 16 of the handle 12. The arm 20 may be of a unitary construction with the handle 12. In other examples the arm 20 may be secured to the handle 12 by welding or adhesive. In still further examples, the arm 20 may be removably connected to the handle, for example by a bayonet or threaded connection. In examples, the arm 20 may include a bend 22, which as depicted, is a 90 degree bend such that the arm 20 includes an arm axis perpendicular to an axis of the handle 12. It will be recognized, however, that other examples of debonding tools may include bends of different degrees, or may have arms that are coaxial to the handle.

Figure 2:
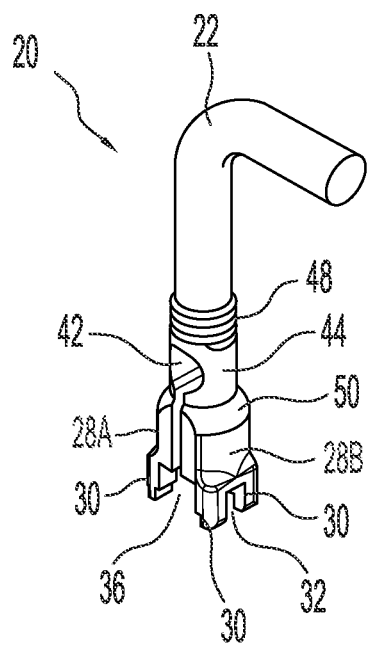
FIG. 2 is a perspective view of the arm.
Figure 3:
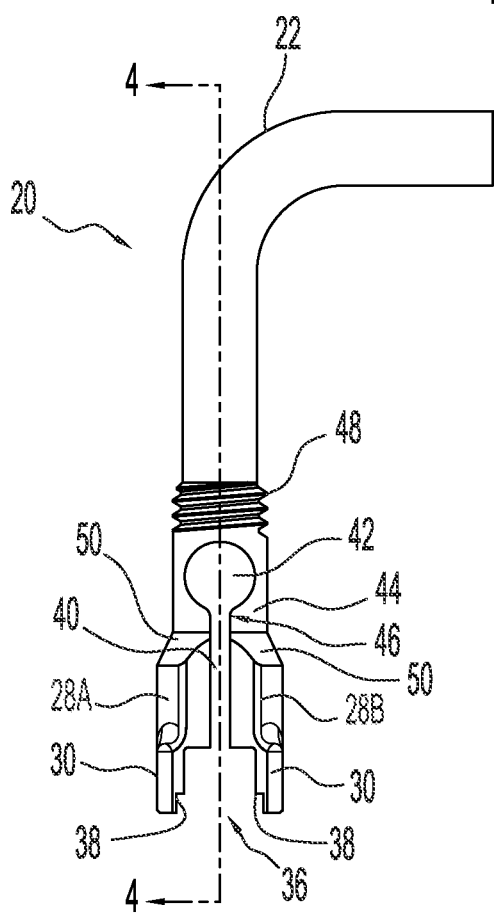
FIG. 3 is a side view of the arm.
Figure 4:
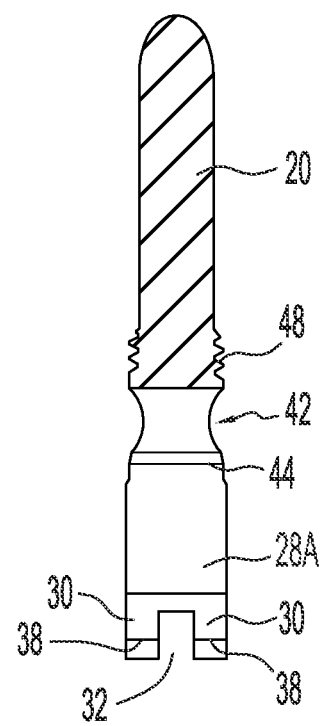
FIG. 4 is a sectional view of the arm taken along the line 4-4 of FIG. 3.

The arm 20 terminates in a tip 24 at the proximal end of the arm 20. The arm 20 includes a barrel 44 which will be described in further detail herein. A collar 26 is movably connected to the arm 20 at the proximal end but spaced distally away from the tip 24. FIGS. 2-4 depict the arm in isolation to better show features of the arm. FIG. 2 is a perspective view of the arm 20 FIG. 3 is a side view of the arm 20. FIG. 4 is a sectional view of the arm 20 taken along the line 4-4 of FIG. 3. The proximal end of the arm 20 includes two opposed fingers 28A, 28B. The fingers 28A, 28B each terminate in projections 30. In the examples shown, each finger 28A, 28B terminates in two projections 30. The projections 30 on each finger 28A, 28B are separated by a groove 32. At the tip 24 of the arm 20, the fingers 28A, 28B and define a channel 36. The channel 36 separates the projections 30 of the respective fingers 28A, 28B. The fingers 28A, 28B further include shelves 38 that extend exterior of the channel 36 into the projections 30. Therefore, a portion of the projections 30 on opposite fingers 28A, 28B are spaced apart a greater distance, providing an increased channel width compared to the width of the rest of the channel 36 between the other portions of the projections 30 and the fingers 28A, 28B.

A slot 40 extends distally between the fingers 28A, 28B from the channel 36. The slot extends from the channel 36 between the fingers to an eye 42 within the barrel 44. The slot 40 and the eye 42 define a keyhole 46 between the fingers 28A, 28B. The barrel 44 is cylindrical in shape and includes the eye 42 as well as threads 48 as will be discussed in further detail herein. The fingers 28A, 28B extend away from the barrel 44. Angled flanges 50 are located on the exterior of the fingers 28A, 28B and provide a transition from the barrel 44 for the fingers 28A, 28B.

Figure 5:
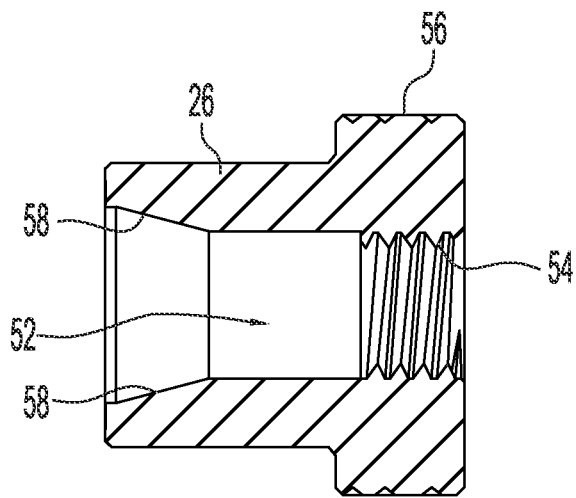
FIG. 5 is a sectional view of an example of a collar.

Referring to FIG. 1, collar 26 is threadedly connected to the arm 20 at the threads 48. The collar 26 is further shown in cross-sectional view in FIG. 5. The collar 26 includes a bore 52 in which the arm 20 is received. In an example, the bore 52 may receive portions of the arm 20 including, but not limited to, the barrel 44. The collar 26 is translatable along the arm 20 about the bore 52. The collar 26 includes threads 54 along the interior of at least a portion of the bore 52. The threads 54 of the collar 26 mate with the threads 48 on the barrel 44 for a threaded engagement. A textured surface 56, which may further include knurling, on the exterior of the collar facilitates a user to hold the collar and to rotate the collar 26 relative to the arm 20. The rotation of the collar 26 in the threaded engagement with the arm 20 translates the collar 26 towards or away from the tip 24. The collar 26 includes an interior chamfer 58 on the inside of the bore 52 at an end of the collar 26 opposite the threads 54. As the collar 26 translates towards the tip 24, the interior chamfer 58 engages the angled flanges 50. In an example, the interior chamfer 58 extends at a more acute, or lesser, angle relative to the arm axis than an angle of the angled flange 50 relative to the arm axis. In one example, the interior chamfer 58 has a 15 degree angle relative to the arm axis while the angled flange 50 has a 25 degree angle relative to the arm axis. It will be recognized that other angles may be used, including, but not limited to, an angled flange 50 perpendicular to the arm axis. Radially inward force from the collar 26, specifically the interior chamfer 58, against the angled flanges 50 moves the fingers 28A, 28B radially interior towards each other, flexing the fingers 28A, 28B about the eye 42 in the space between the fingers 28A, 28B created by the keyhole 46. This reduces the width of the channel 36. This controlled reduction of the width of the channel 36, enables the user to provide a fitted engagement between the fingers 28A, 28B and a bracket to be debonded positioned within the channel 36.

Figure 6:
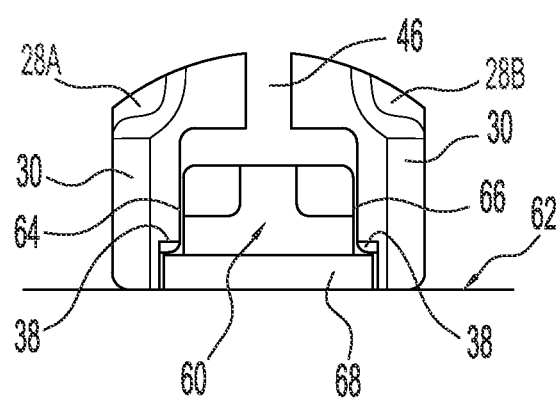
FIG. 6 is a detailed view of the fingers in engagement with an orthodontic bracket.
Figure 7:
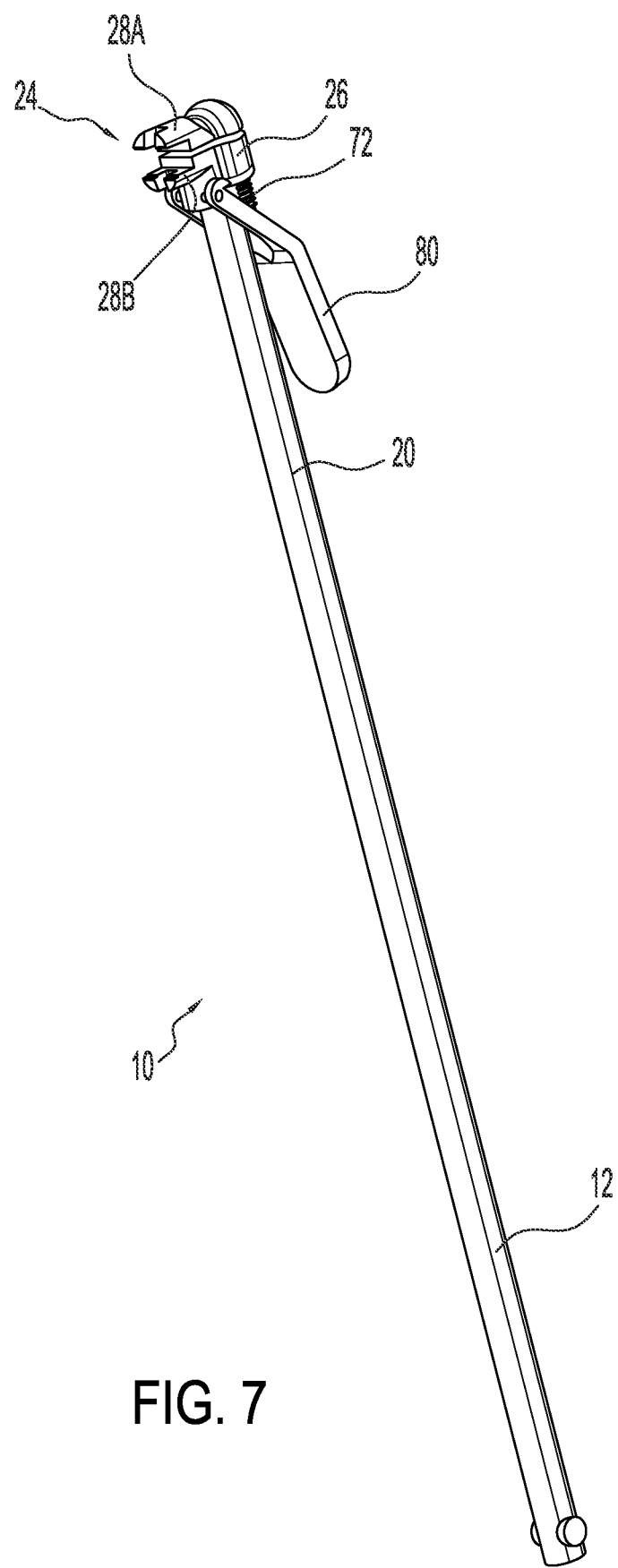
FIG. 7 is a perspective view of a debonding tool.
Figure 8:
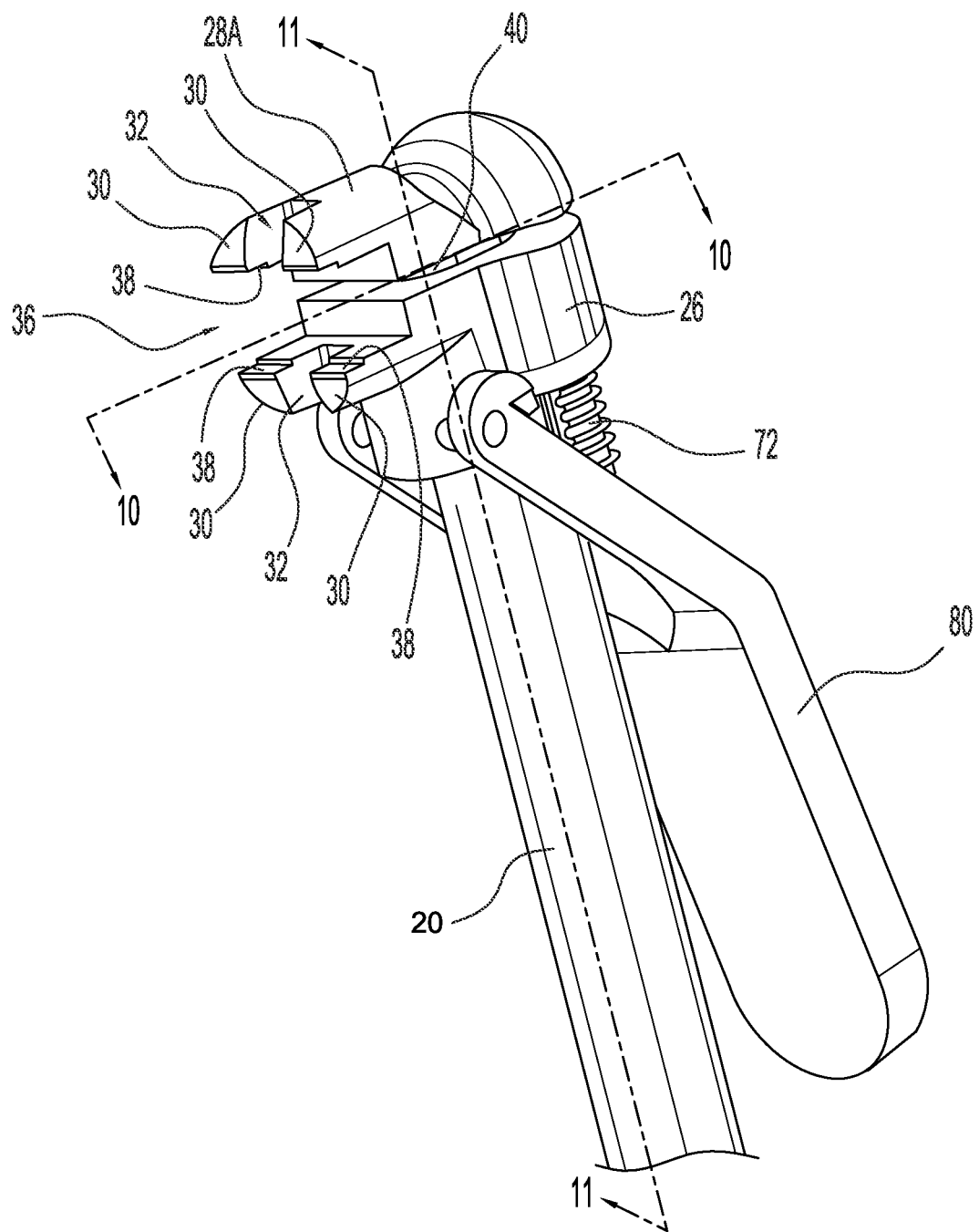
FIG. 8 is a detailed view of a portion of FIG. 7.
Figure 9:
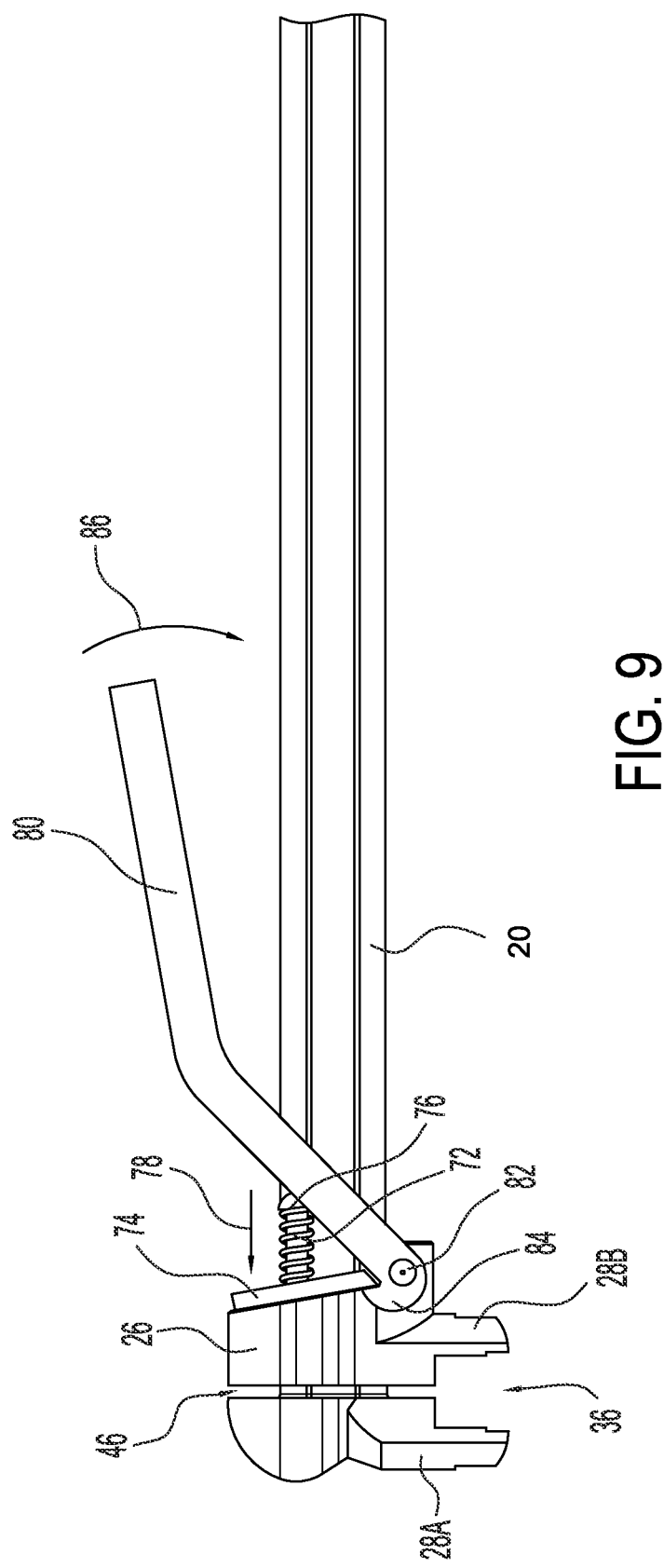
FIG. 9 is a side view of the debonding tool.
Figure 10:
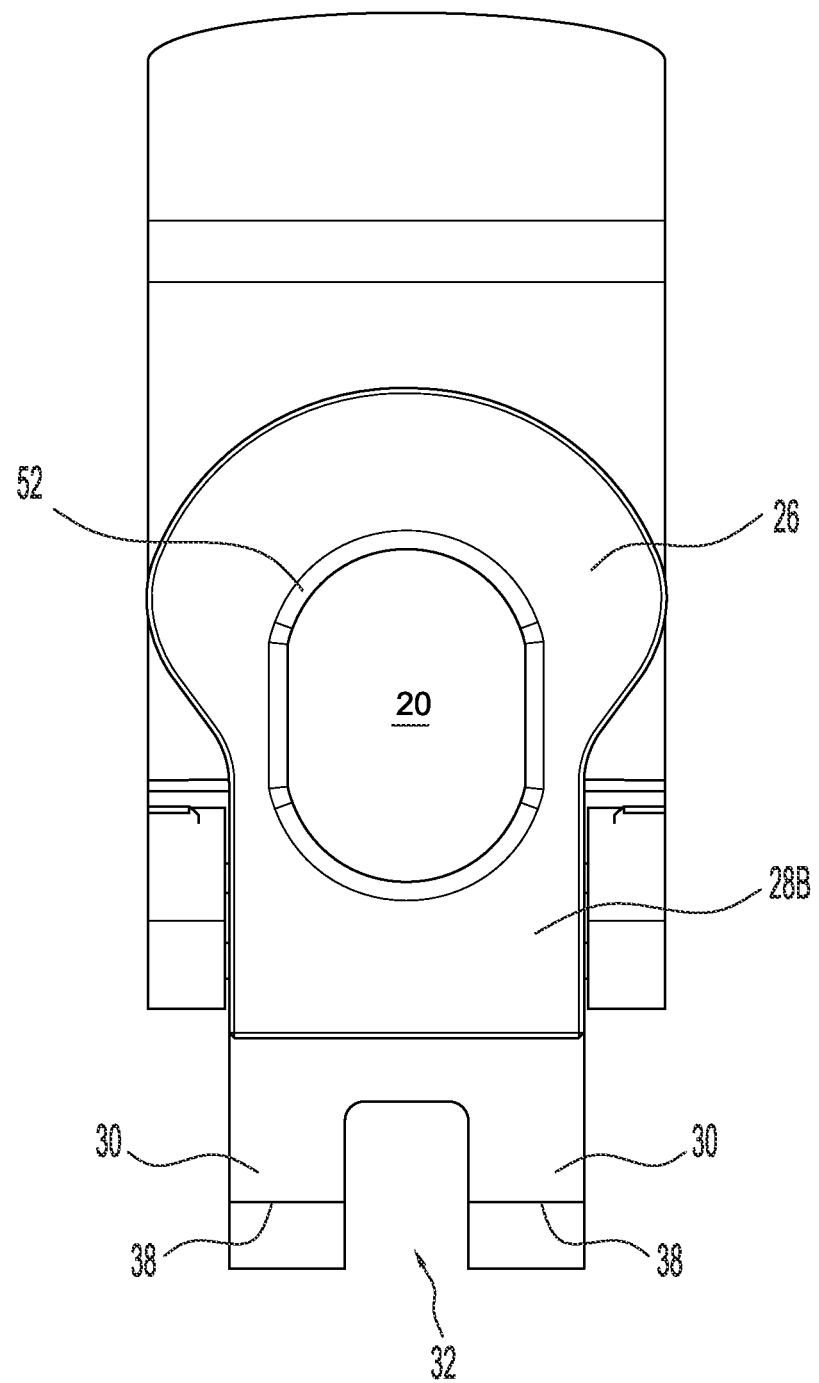
FIG. 10 is a sectional view taken along line 10-10 of FIG. 8.
Figure 11:
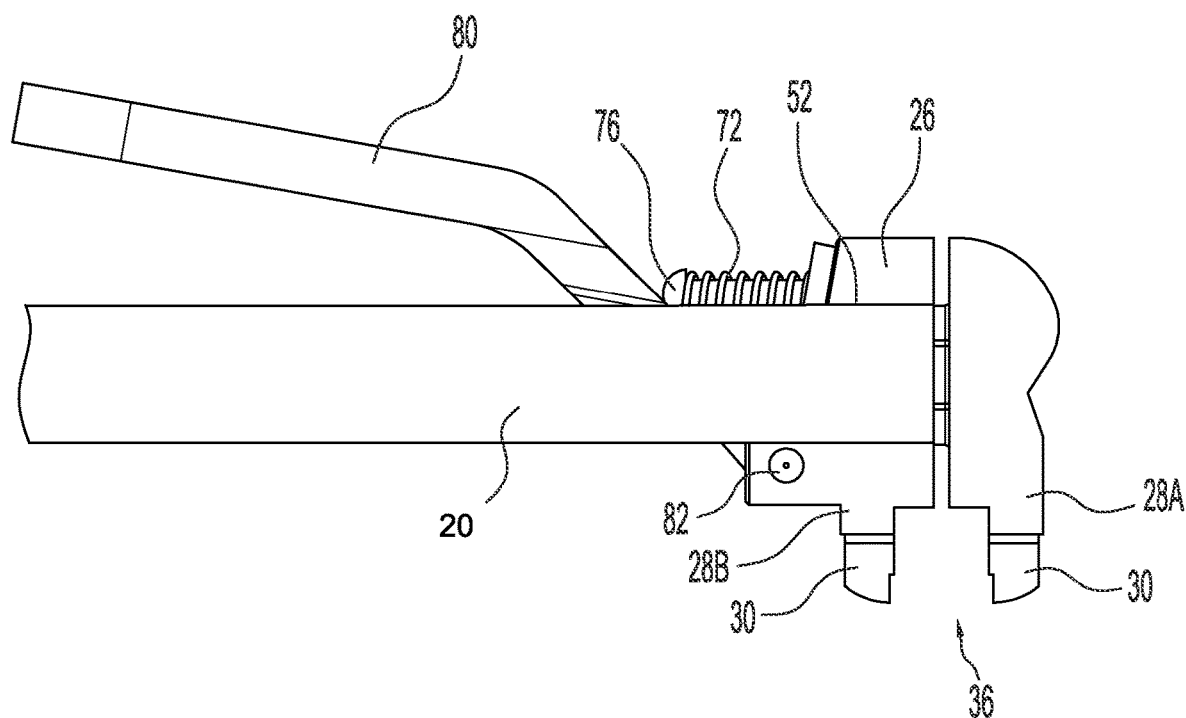
FIG. 11 is a sectional view taken along line 11-11 of FIG. 8.
Figure 12:
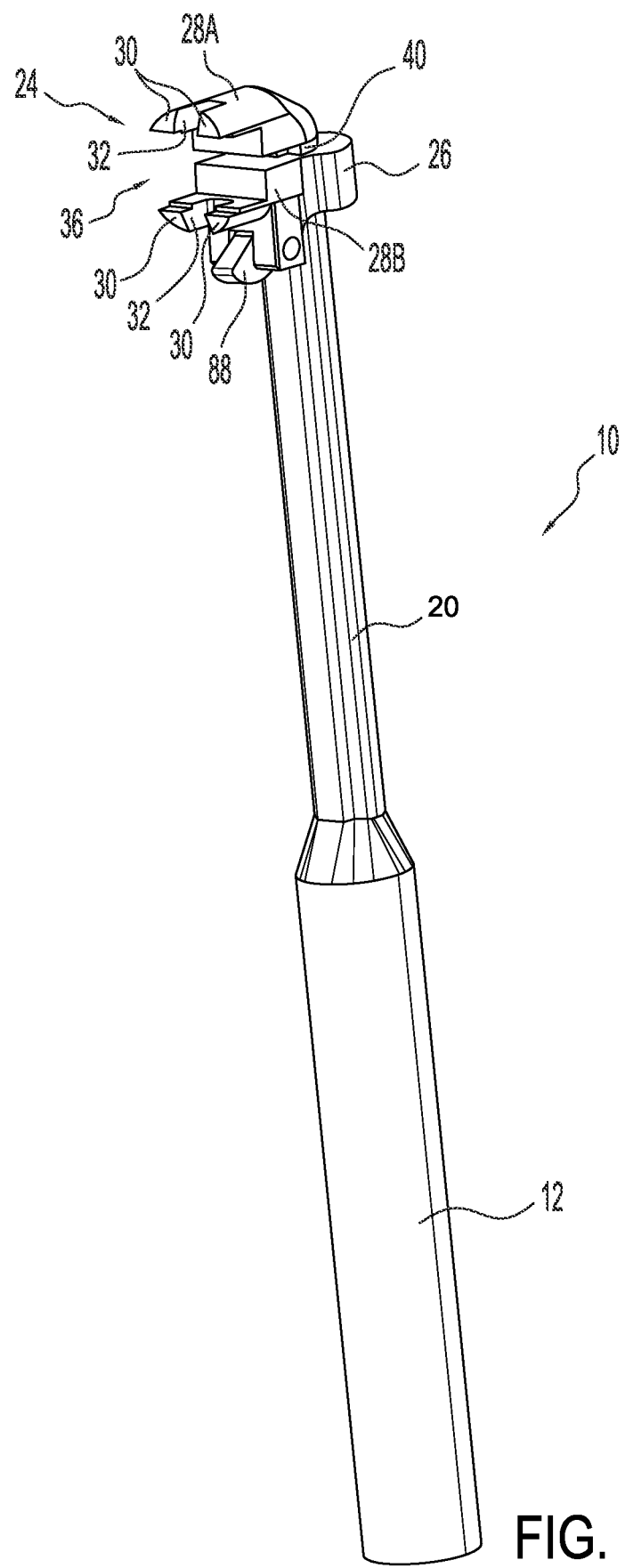
FIG. 12 is a perspective view of a debonding tool.
Figure 13:
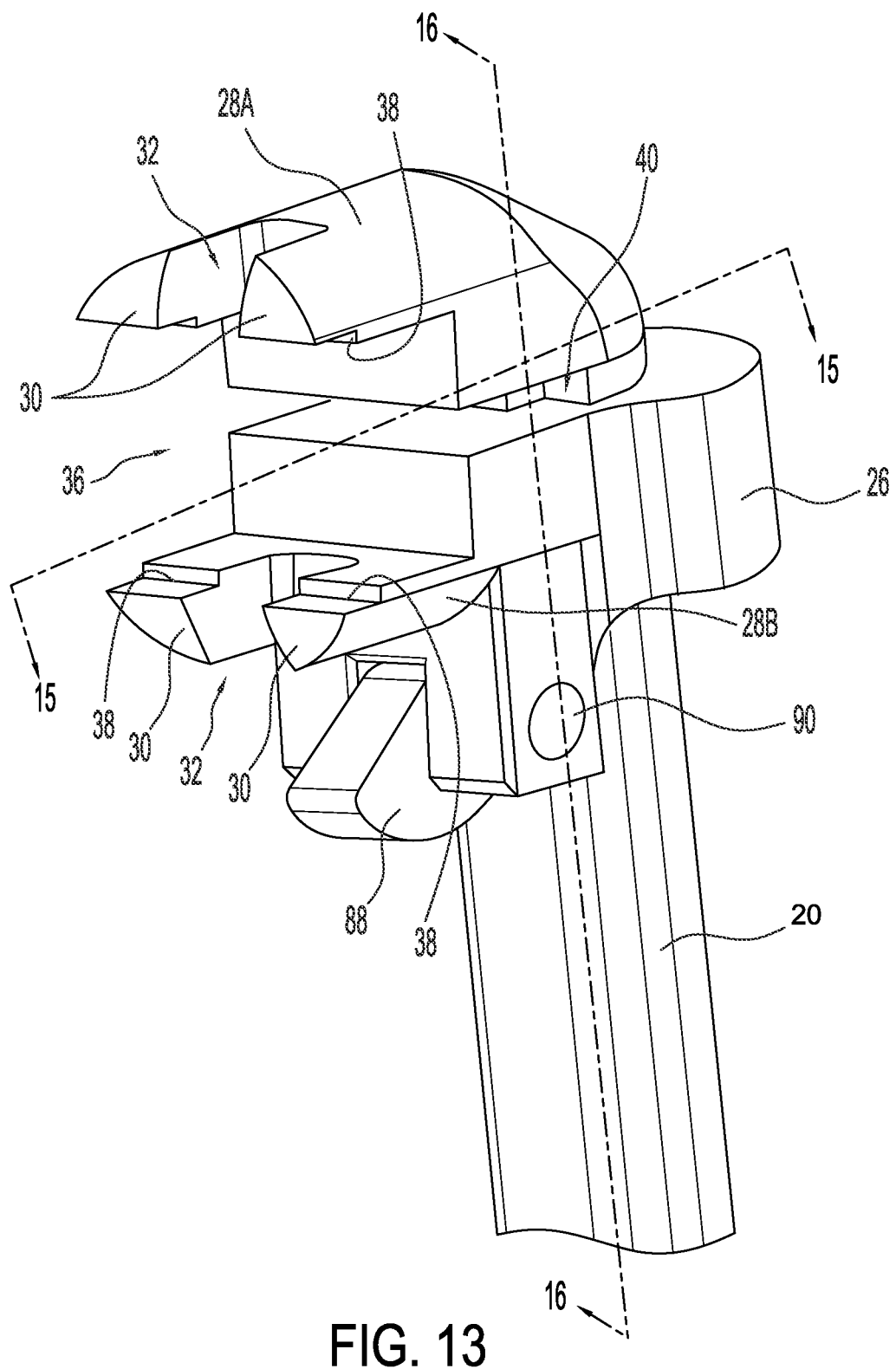
FIG. 13 is a detailed view of a portion of FIG. 12.
Figure 14:
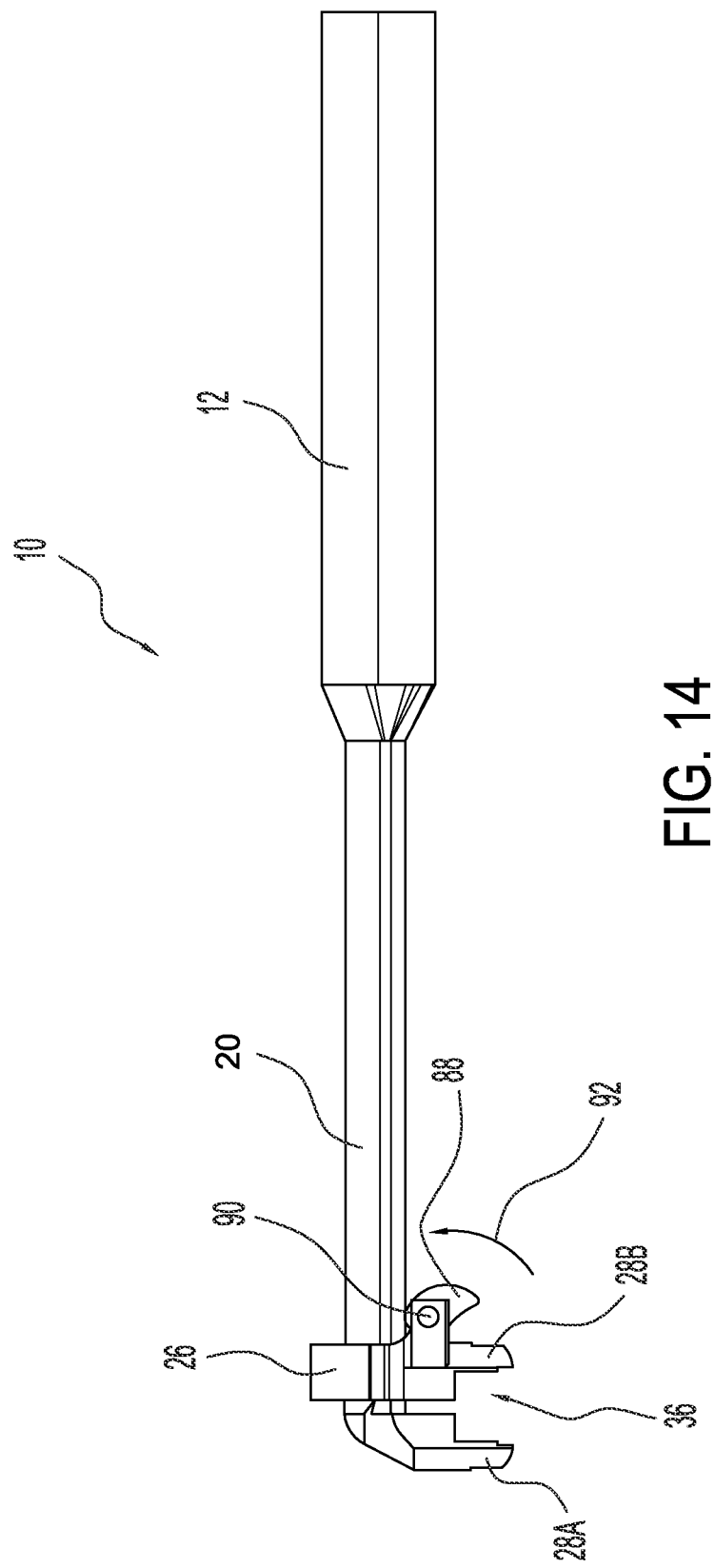
FIG. 14 is a side view of the debonding tool.
Figure 15:
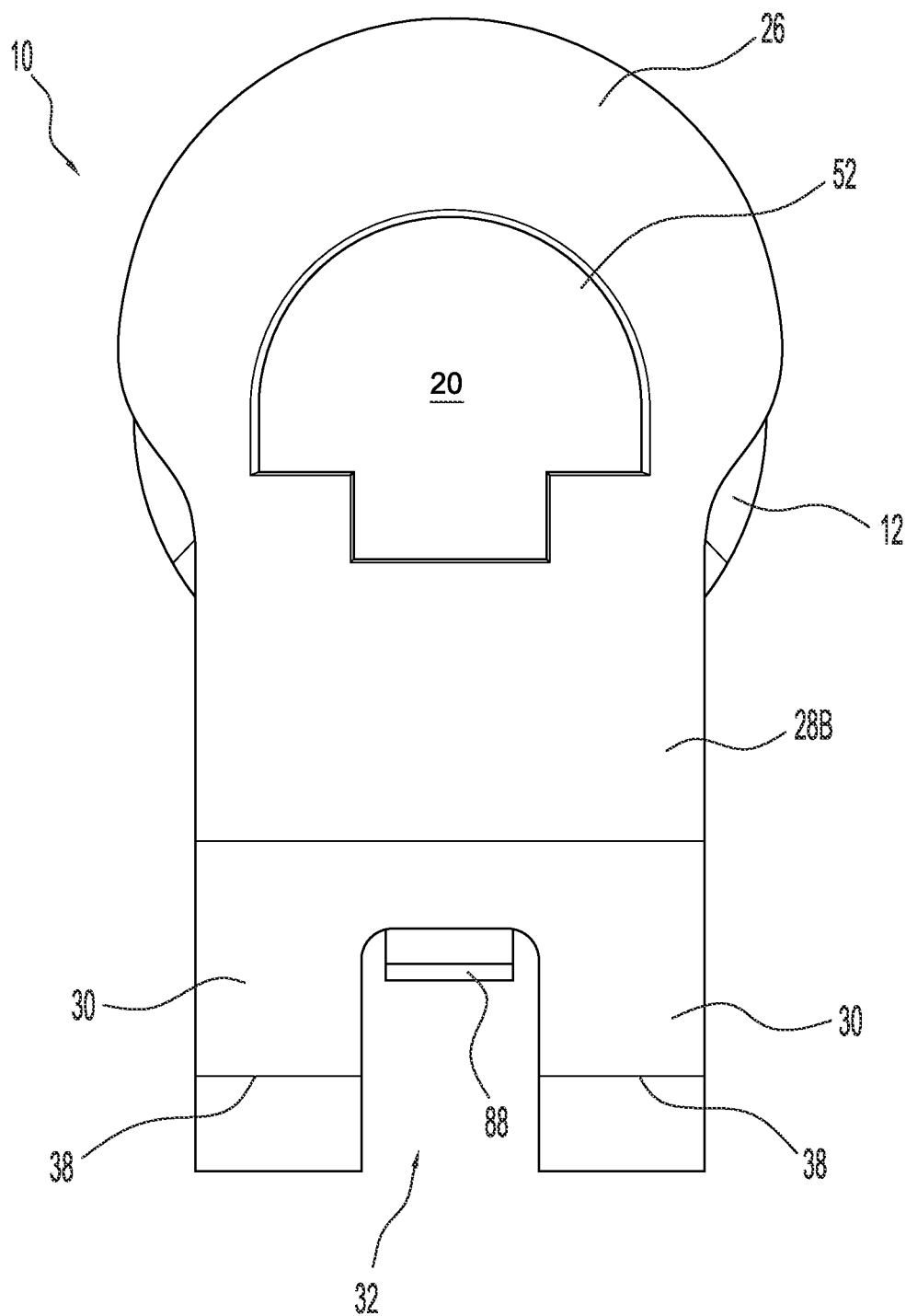
FIG. 15 is a sectional view taken along line 10-10 of FIG. 13.
Figure 16:
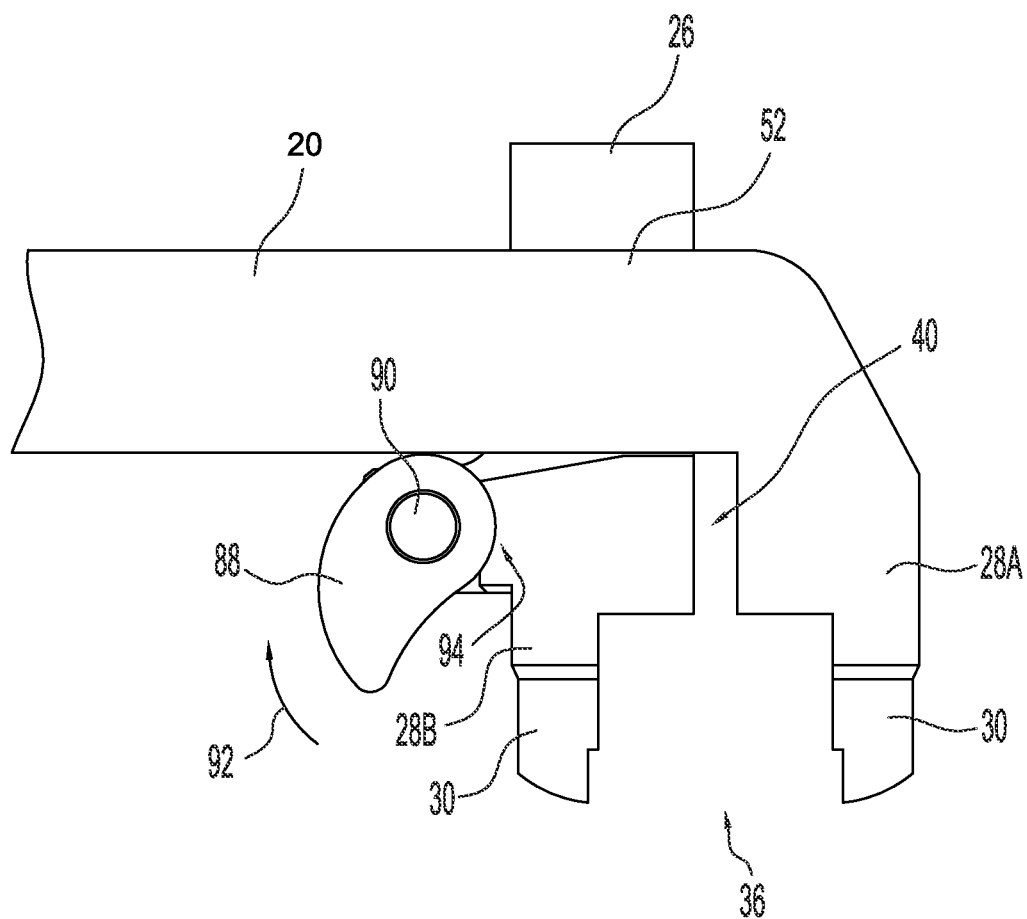
FIG. 16 is a sectional view taken along line 11-11 of FIG. 13.

FIG. 6 is a detailed view of the debonding tool tip 24 with the fingers 28A, 28B secured into engagement with a bracket 60 to be debonded. The bracket 60 is secured to a tooth surface 62 of a patient. The fingers 28A, 28B, and more specifically the projections 30 of the fingers 28A, 28B, are secured against the sides of the bracket 60. Specifically, the projections 30 are secured against the mesial side 64 and the distal side 66. The shelves 38 into the projections 30 provide a space for the projections 30 to extend past a bonding pad 68 of the bracket 60 so that the projections 30 can extend to the tooth surface 62.

When in use, the collar 26 is rotated to disengage from the angled flange 50 and the fingers 28A, 28B are in an open position. The fingers 28A, 28B are positioned about the bracket 60 and the collar 26 threadingly tightened so move the fingers 28A, 28B to a closed position with the projections 30 in respective engagement against the mesial side 64 and the distal side 66 of the bracket 60. If an arch wire is still in place (for example when replacing a broken bracket intra-treatment), the arch wire is positioned within the groove 32 between projections 30 of a single finger 28A, 28B. Radially inward displacement of the fingers 28A, 28B from the force of the collar 26 applied against the fingers 28A, 28B, secures the engagement of the projections 30 against the bracket 60. In an example, the projections 30 engage the bracket 60 for all or most of the bracket 60 in the lingual-buccal dimension, for example from the tie wings 70 to the bonding pad 68.

When the debonding tool 10 is secured to the bracket 60 in this manner, the arm 20 projects in the buccal direction away from the tooth surface 62 and the handle 12 is generally co-planar with a plane of the arch wire. The orthodontist rotates the debonding tool 10 by applying a force to the handle 12 to pivot the handle 12 generally within the arch wire plane. That is, the orthodontist moves the handle distally to pivot the debonding tool 10 about the bracket 60. The secure engagement of the projections against the mesial and distal sides 64, 66 of the bracket 60 spreads the force from the rotation of the debonding tool 10 across the entire body of the bracket 60. By spreading this debonding force across the bracket, the force is not concentrated on any edge or other weakened portion of the bracket 60, which can lead to the breaking problems noted above, when the bracket is removed from the surface of the tooth.

It will be recognized that the fingers 28A, 28B may be constructed so that the fingers 28A, 28B and/or the interior surfaces of the fingers 28A, 28B defining the channel 36 are parallel either when in the open position and/or when in the closed position.

In still further examples, the arm 20, fingers 28A, 28B, or portions of the arm 20 and/or fingers 28A, 28B may be constructed of a material with ductile or resilient properties, thereby providing some give during application of the debonding force to further facilitate removal of the bracket 60 without breaking the bracket 60.

FIGS. 7-11 depict another example of a debonding tool 10. It will be recognized that like reference numerals between the figures refer to similar structures between the examples. The debonding tool 10 includes a handle 12. An arm 20 extends from the handle. FIGS. 7-11 depict an example of a debonding tool wherein the arm 20 is coaxial with the handle and also depict an example wherein the arm 20 and the handle 12 are a unitary construction. The debonding tool includes a tip 24 with a pair of opposed fingers 28A, 28B. The fingers 28A, 28B each terminate in projections 30. The fingers 28A, 28B exemplarily each include two projections 30 separated by a groove 32. The groove 32 is configured to receive an arch wire therein when the debonding tool 10 is used intra-treatment to remove a bracket when an arch wire is in place. The fingers 28A, 28B are separated by a channel 36 defined between the fingers 28A, 28B. The fingers 28A, 28B are exemplarily parallel to each other. As will be described herein, channel 36 is dimensioned to be adjustable in width between an open width that is greater than a nominal or expected bracket width and a closed width that is the same as or narrower than a nominal or expected bracket width. A slot 40 extends from the channel 36 between the fingers 28A, 28B.

The debonding tool 10 as depicted in FIGS. 7-11 includes a collar 26 that translates along the arm 20. The collar 26 includes a bore 52. The debonding tool 10 includes a finger 28A that is rigidly secured to the arm 20 and a finger 28B that is secured to the collar 26. The finger 28B is connected to the arm 20 through the collar 26. Translation of the collar 26 along the arm moves the finger 28B relative to the finger 28A. Thus the translation of the collar 26 results in relative movement of the fingers 28A, 28B. This movement between open and closed positions changes the distance between the fingers 28A, 28B, and the width of the channel 36. In an example, the finger 28A extends perpendicularly from the arm 20 and the finger 28B extends perpendicularly from the arm 20 via the collar 26 and the fingers 28A and 28B are parallel in both the open position and the closed position.

The debonding tool 10 includes a spring 72 that extends between a force plate 74 on the collar 26 and a stop 76 on the arm 20. The spring 72 places a biasing force in the direction of arrow 78 against force plate 74, and correspondingly the collar 26, to bias the collar 26 into the closed position, wherein the channel 36 between the fingers 28A, 28B is minimized. The debonding tool 10 further includes an effort arm 80 that pivots about a pin 82. A load arm 84 extends from the effort arm 80 away from the pin 82 and engages the force plate 74. When a force is applied to the effort arm 80 in the direction of arrow 86, the effort arm 80 and the load arm 84 rotate about the pin 82 and a force is applied to the force plate 74 by the load arm 84 that overcomes the force of the spring 72 in the direction of arrow 78. This compresses the spring 72 and moves the collar 26 from the closed position to an open position wherein the channel 36 has a maximum width. This maximum width of the channel 36 when in the open position facilitates positioning of a bracket within the channel 36. When the bracket is positioned, the force on the effort arm 80 is released, and the spring 72 returns the collar 26 to the closed position in the direction of arrow 78.

FIGS. 12-16 depict a further example of a debonding tool 10. It will be recognized that like reference numerals between the figures refer to similar structures between the examples. The debonding tool includes a tip 24 with a pair of opposed fingers 28A, 28B. The fingers 28A, 28B each terminate in projections 30. The fingers 28A, 28B exemplarily each include two projections 30 separated by a groove 32. The groove 32 is configured to receive an arch wire therein when the debonding tool 10 is used intra-treatment to remove a bracket when an arch wire is in place. The fingers 28A, 28B are separated by a channel 36 defined between the fingers 28A, 28B. The fingers 28A, 28B are exemplarily parallel to each other. As will be described herein, channel 36 is dimensioned to be adjustable in width between an open width that is greater than a nominal or expected bracket width and a closed width that is the same as or narrower than a nominal or expected bracket width. In an example, the finger 28A extends perpendicularly from the arm 20 and the finger 28B extends perpendicularly from the arm 20 via the collar 26 and the fingers 28A and 28B are parallel in both the open position and the closed position. A slot 40 extends from the channel 36 between the fingers 28A, 28B.

The debonding tool depicted in FIGS. 12-16 includes a cam arm 88 that pivots about a pin 90. The cam arm 88 engages a cam surface 94 of the collar 26. As the cam arm 88 is rotated in the direction of arrow 92, the cam arm 88 engages the cam surface 94 and pushes the collar 26 to translate along the arm 20 to move the collar 26 from the open position to the closed position with the finger 28B towards the finger 28A. Movement of the cam arm 88 in the opposite direction can reverse the movement, returning the collar of the debonding tool to the open position. Thus the translation of the collar 26 results in relative movement of the fingers 28A, 28B. This movement between open and closed positions changes the distance between the fingers 28A, 28B, and the width of the channel 36. In use, the bracket to be removed is positioned within the channel 36 and the cam arm 88 operated to close the debonding tool with the bracket engaged by the fingers 28A and 28B. The cam arm 88 is released after the bracket is removed to dispense of the bracket for disposal.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An orthodontic debonding system comprising:
   an orthodontic bracket comprising a mesial sidewall, a distal sidewall, and an arch wire extending through the orthodontic bracket; and
   a debonding tool comprising:
      a handle;
      an arm extending from the handle;
      first and second opposed fingers, a channel defined between the first and second opposed fingers, the channel configured to receive the orthodontic bracket therein, wherein the first and second opposed fingers each comprise a groove that separates projections on a respective finger of the first and second opposed fingers; and
      a collar translatable along the arm and operable to effect relative movement between the first and second opposed fingers between open and closed positions;
      wherein when the first and second opposed fingers are in the closed position, the first and second opposed fingers are in engagement with the respective mesial sidewall and distal sidewall of the orthodontic bracket received within the channel and the arch wire extends through the grooves of the first and second opposed fingers.

2. The debonding tool of claim 1, wherein the collar comprises a bore and the arm is received within the bore of the collar.

3. The debonding tool of claim 1, wherein in the open position, the first and second opposed fingers are parallel.

4. The debonding tool of claim 1, wherein the first and second opposed fingers are coaxial to the arm.

5. The debonding tool of claim 1, wherein the handle and the collar further each comprise a textured surface.

6. The debonding tool of claim 1, wherein the handle has a major axis that is perpendicular to a major axis of at least a portion of the arm.

7. The debonding tool of claim 1, further comprising a spring that extends between a stop on the arm and the collar, wherein the spring places a biasing force against the collar to bias the collar in the closed position.

8. The orthodontic system of claim 1, wherein the arm comprises a barrel comprising exterior threads and the collar comprises a bore comprising interior threads and the arm is coaxially received within the bore of the collar, and the collar comprises a bore and the arm and the collar are threadingly engaged to move the first and second opposed fingers between the open and closed positions.

9. The debonding tool of claim 8 further comprising a keyhole separating the first and second opposed fingers, the keyhole comprising an eye through the barrel and a slot extending from the eye to the channel.

10. The orthodontic system of claim 8, wherein the arm comprises an angled flange at a transition between the barrel and the first and second opposed fingers and the bore of the collar comprises an interior chamfer, wherein engagement between the angled flange and the interior chamfer moves the first and second opposed fingers between the open and closed positions.

11. The debonding tool of claim 10, wherein an angle of the angled flange relative to the axis of the arm is greater than an angle of the interior chamfer relative to the axis of the arm.

12. The orthodontic system of claim 1, wherein the arm further comprises a bend such that a portion of the arm extends perpendicular to the handle; and wherein when the first and second opposed fingers engage the orthodontic bracket, the handle is positioned within a plane of the arch wire.

13. The orthodontic system of claim 1, wherein the orthodontic bracket further comprises a bonding pad; and wherein the fingers on the first and second opposed fingers of the bonding tool each further comprise a shelf that extends from the channel in a direction into a respective finger, wherein the shelves define portions of the channel configured to receive the bonding pad therein.

14. The debonding tool of claim 1, wherein the second finger is connected to the collar and the second finger moves with the translation of the collar relative to the first finger between the open and closed positions.

15. The debonding tool of claim 14, further comprising a cam arm operable to apply a force against the collar to translate the collar along the arm to move the collar between the open and closed positions.

16. The debonding tool of claim 15, wherein the cam arm pivots about a pin to move the collar from the closed position to the open position.

17. The debonding tool of claim 15, wherein the cam arm pivots about a pin to engage a cam surface to move the collar from the open position to the closed position.

* * * * *